United States Patent [19]

Meier

[11] 4,370,779
[45] Feb. 1, 1983

[54] METHOD AND APPARATUS FOR INTERMITTENTLY DISPENSING FLOWABLE FOODSTUFF

[75] Inventor: Dieter Meier, Kirchlinteln, Fed. Rep. of Germany

[73] Assignee: Vemag, Verden, Fed. Rep. of Germany

[21] Appl. No.: 151,088

[22] Filed: May 19, 1980

[30] Foreign Application Priority Data

May 26, 1979 [DE] Fed. Rep. of Germany ....... 2921427

[51] Int. Cl.$^3$ ...................... A22C 11/08; G01F 13/00
[52] U.S. Cl. ......................................... 17/49; 17/40; 222/22
[58] Field of Search .................. 17/33, 35, 40, 49; 141/13; 222/14–22, 23, 63, 70; 177/119–123; 318/561, 632; 198/524, 548, 855

[56] References Cited

U.S. PATENT DOCUMENTS

| 2,889,574 | 6/1959 | Thielen et al. | 17/40 |
| 3,001,597 | 9/1961 | Stock | 177/120 |
| 3,303,967 | 2/1967 | Munson | 222/14 |
| 3,733,653 | 5/1973 | Javaloy et al. | 17/33 X |
| 3,743,140 | 7/1973 | Saverbrey | 222/70 X |
| 3,748,690 | 7/1973 | Niedecker | 17/33 |
| 3,883,925 | 5/1975 | Muller | 17/33 |
| 4,099,113 | 7/1978 | Hayashi | 318/561 X |

FOREIGN PATENT DOCUMENTS 1128782 4/1962 Fed. Rep. of Germany .

Primary Examiner—Robert B. Reeves
Assistant Examiner—Edward M. Wacyra
Attorney, Agent, or Firm—Townsend & Townsend

[57] ABSTRACT

Disclosed is a method and apparatus for intermittently dispensing a flowable foodstuff such as a sausage material into a container, e.g. a sausage casing, in portions of a predetermined size. A conveyor dispenses the foodstuff into the container and is deactivated when a quantity of the foodstuff has been placed into the container which is slightly less than the desired portion. After deactivation a small terminal mass of the foodstuff continues to flow into the container and the terminal mass represents the remainder to bring the dispensed foodstuff up to the desired portion. During each operating cycle the terminal mass is measured and this measurement is used during the next operating cycle to determine when the conveyor should be deactivated so that the next terminal mass brings the just dispensed portion up to the desired level.

14 Claims, 3 Drawing Figures

METHOD AND APPARATUS FOR INTERMITTENTLY DISPENSING FLOWABLE FOODSTUFF

This invention relates to a method and an apparatus for intermittently extruding a prepared, flowable sausage mass or the like into suitable containers or casings in predetermined quantities. The extrusion steps alternate continuously with separation steps to separate the last-extruded portion from the following portion. As each extrusion step is terminated by decelerating the sausage means, a trailing or terminal mass or quantity of sausage material flows into the last-extruded portion.

Generally speaking, such apparatus and methods are known to have, for example, an intermittently operated screw conveyor which incrementally advances with a constant angle of rotation. The conveyor is rotated via an electromagnetically actuated coupling/brake combination that has a predetermined operating cycle. During each operating interval, a control device engages the coupling, measures the angle of rotation covered during the operating interval and, after a predetermined angle of rotation has been reached, disengages the coupling and brakes the conveyor to a standstill. The casing section adjoining the last-filled portion is thereupon severed by twisting it off. Thereafter, the next filling step commences, and so forth.

A disadvantage of the known method and apparatus is that the terminal quantity of sausage mass conveyed into the last-filled portion during the braking is not adequately controlled, that is it is only very roughly accounted for when adjusting the desired volume of a portion, since the chronological progress of the braking step cannot take account of the terminal volume of quantity of sausage material conveyed during the braking step. Given a constant load, stable temperature conditions and a correct mechanical condition and adjustment of the apparatus, it is possible to estimate the volume of terminal mass and to trigger the braking step so that the volume of sausage material conveyed up to the commencement of the braking step and the subsequently still flowing terminal mass are substantially equal to the desired volume of the portion. However, under a variable load, unstable temperature conditions and/or changes in the speed of the conveyor screws, the terminal mass and, therefore, also the size of the whole portion fluctuate.

It is therefore an object of the invention to provide a method and an apparatus of the type indicated above which insures that the selected portion volume remains substantially constant even over extended operating times and despite fluctuating load, temperature and/or speed conditions.

This is accomplished in accordance with the invention in that the terminal mass or quantity of sausage material delivered during deceleration of the preceding extrusion step is acertained and that the difference between the size of the portion and the measured terminal mass is established. The braking or decelleration of the actual dispensing step is then initiated when the amount of sausage material actually extruded equals that difference.

The apparatus of the invention comprises a conveyor which is operated intermittently and dispenses a desired volume of sausage material into containers or casings. The apparatus may include a device for separating the last-dispensed portion from the next portion. It further includes a control device comprising a selector for dispensing the desired portion volume, a device for measuring the volume dispensed during the individual filling cycles of the apparatus, and a trigger which triggers braking of the conveyor when a specific volume has been dispensed. If necessary it also triggers the next operating cycle of the conveyor.

During braking of the conveyor, the terminal volume of sausage material flows into the last-dispensed portion. The apparatus of the invention is characterized in that the measuring device includes means for ascertaining the volume of the terminal mass and in that a subtraction device is provided which forms the difference between the predetermined volume of sausage material that is to be dispensed into a container or casing and the measured terminal mass, and which stores that difference. Further, the trigger initiates the braking of the conveyor when the measured, actually dispensed volume during an operating cycle equals the stored volume difference.

The advantages of the invention reside in particular in that the actual amount of the terminal mass is ascertained during the braking phase of one or more preceding dispensing steps and that during the ongoing dispensing step braking is triggered when the dispensed sausage material conveyed during such dispensing step equals the desired portion size less the previously ascertained terminal mass. During the following braking step the terminal mass is substantially equal to that measured during the preceding cycle, which was deducted from the dispensing step, so that the terminal mass substantially completes the dispensed amount, resulting in the desired portion size.

The size of the whole portion, of the terminal mass and of the dispensed sausage material can be measured by weighing, that is, in the form of the corresponding weights. Preferably, however, they are measured by volume of the terminal mass and of the dispensed material since, in contrast to measuring by weight, measuring by volume poses no problem even under the generally high frequency at which the dispensing steps take place.

The volume of the terminal mass is preferably determined during braking of the immediately preceding dispensing step. The probability that the volume of the terminal mass during the next cycle is equal to the just measured volume is relatively high, since long-term fluctuations in the load, the temperature, and so forth are thereby eliminated.

Alternatively, the volume of the terminal mass may be determined as the mean value derived from a plurality of individual values which are measured during braking of a predetermined number of preceding dispensing steps, thus also eliminating statistical fluctuations.

The dispensing step preferably comes to a standstill at the end of the braking step. The separation step starts shortly before the end of the extrusion dispensing and is braked, for example, when the next dispensing step starts, so that there is a certain overlapping between the dispensing steps and the separation steps.

In the apparatus of the invention the conveyor is preferably a rotary pump and is driven intermittently via a coupling and an associated brake. The measuring device has a converter which measures the angle of rotation of the pump and emits a number of electric output signals proportional to the angle of rotation. The devices for ascertaining the volume of the terminal mass are disposed in series with the converter and ascertain the volume of this quantity as a corresponding number of output signals of the converter. This results in a conversion of the measured magnitudes into corresponding digital signals. It is then of advantage to digitally set the desired volume of the portions with a selector, for example in the form of a specific count, since the entire control device can then be an electric circuit.

In regard to the hardware, the desired operations may be carried out with an interval counter which may be programmed by the selector. The interval counter receives the output signals of the converter as counting pulses and counts them over a counting interval that is predetermined by the selector and corresponds to the desired volume of a portion. At the end of the counting interval, the counter resets itself to the start of the interval and simultaneously emits a trigger pulse for braking the conveyor pump. After resetting, the counter receives a number of pulses corresponding to the actual volume of the terminal mass, whereby the interval is reduced by an amount corresponding to the volume of the terminal mass. When the next dispensing step commences, the counter subsequently continues to count in the same direction. It reaches the end of the interval when, during the actual dispensing step, the converter has fed to the counter a number of pulses which is equal to the interval minus the volume of the terminal mass, that is, when the conveyor has dispensed a volume of sausage material that is diminished by the volume of the terminal mass. The braking of the conveyor is then triggered. The terminal volume of the sausage material flowing during this braking step then increases the size of the portion to the desired or predetermined size.

When the sausage material is filled into a tubular casing, the separator is preferably a twisting device or a clipping machine which tightly constricts the section of the casing adjoining the filled portion. When filling the sausage mass into different containers, other suitable separator devices may be used, for example conveyors for the container or the like.

DESCRIPTION OF THE PREFERRED EMBODIMENTS

Figure 1:
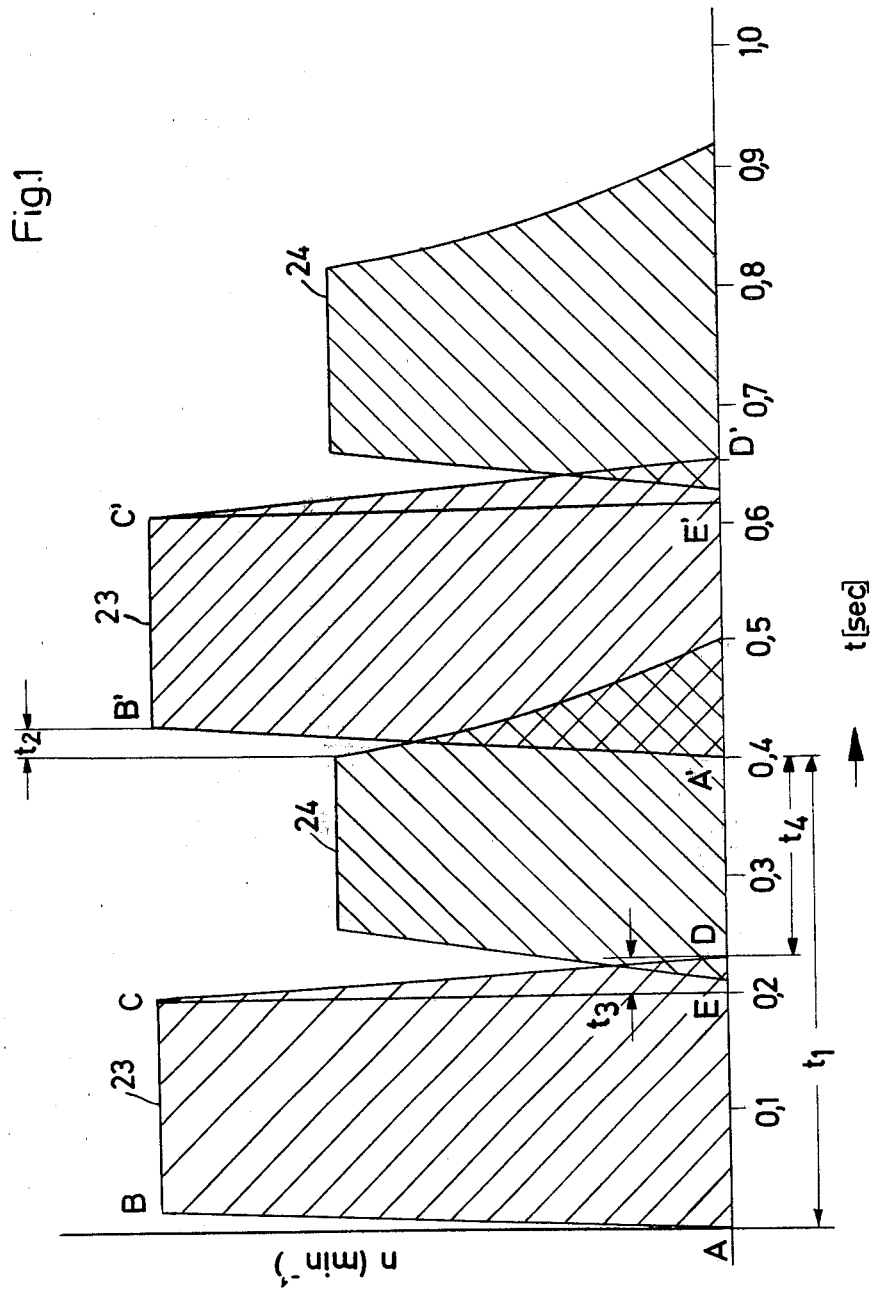
FIG. 1 is a sequence diagram illustrating the operational steps of the present invention.

FIG. 1 chronologically illustrates the sequencing of an apparatus constructed according to one embodiment of the invention to fill a sausage mass into a tubular casing (not separately shown). The apparatus has, for example, a screw conveyor with at least one rotating conveyor screw for transporting the sausage material, and a separator in the form of a twisting device. Shown is the change between conveyor filling or dispensing steps 23 and the separating steps or intervals 24. After a short acceleration time $t_2$—curve section AB—the desired rate of rotation of the screw conveyor is reached and maintained during the conveyor filling step 23, curve section BC. The conveyed volume during the operating interval up to the time point C is represented by the surface ABCE obtained by integration of the curve between A and C, and by summing the revolutions of the conveyor screw up to point C. At point C, rotation of the conveyor screw is braked and, after a short deceleration time $t_3$, it comes to a standstill at the point D. During the braking interval, a terminal volume of sausage material, represented by the surface determined by the points CDE, enters the casing and is added to the just dispensed sausage material. Since the braking step cannot be controlled by the control device, it must be triggered when the volume dispensed up to the time when braking commenced corresponds to the desired volume of the portion minus the volume of the terminal mass. Thus, during the braking interval, the terminal mass brings the whole dispensed sausage material to the desired volume.

Before a complete standstill of the conveyor screw is reached, at point D, the twisting device is actuated which, after a short starting phase, twists the casing section adjoining the last-filled portion over a predetermined period of time and with a predetermined speed to thereby replace the just filled casing, or section of a casing, with a fresh casing section that is to be filled during the next operating cycle. The twisting device is deactivated and comes to a standstill after a short deceleration phase. Simultaneously with the deactivation of the twisting device, the conveyor screw is again energized, at point A', and it goes through the next operating cycle A'B'C'D'. The cycle interval $t_1$ from the start of a complete operating cycle to the start of the next complete cycle may be decreased by overlapping of the filling steps or intervals 23 with the separation intervals 24. The cycle interval $t_1$ and the pause time $t_4$–from the standstill of an operating interval to the commencement of the next operating interval–can be selected. The same applies to the rates of rotation.

Figure 2:
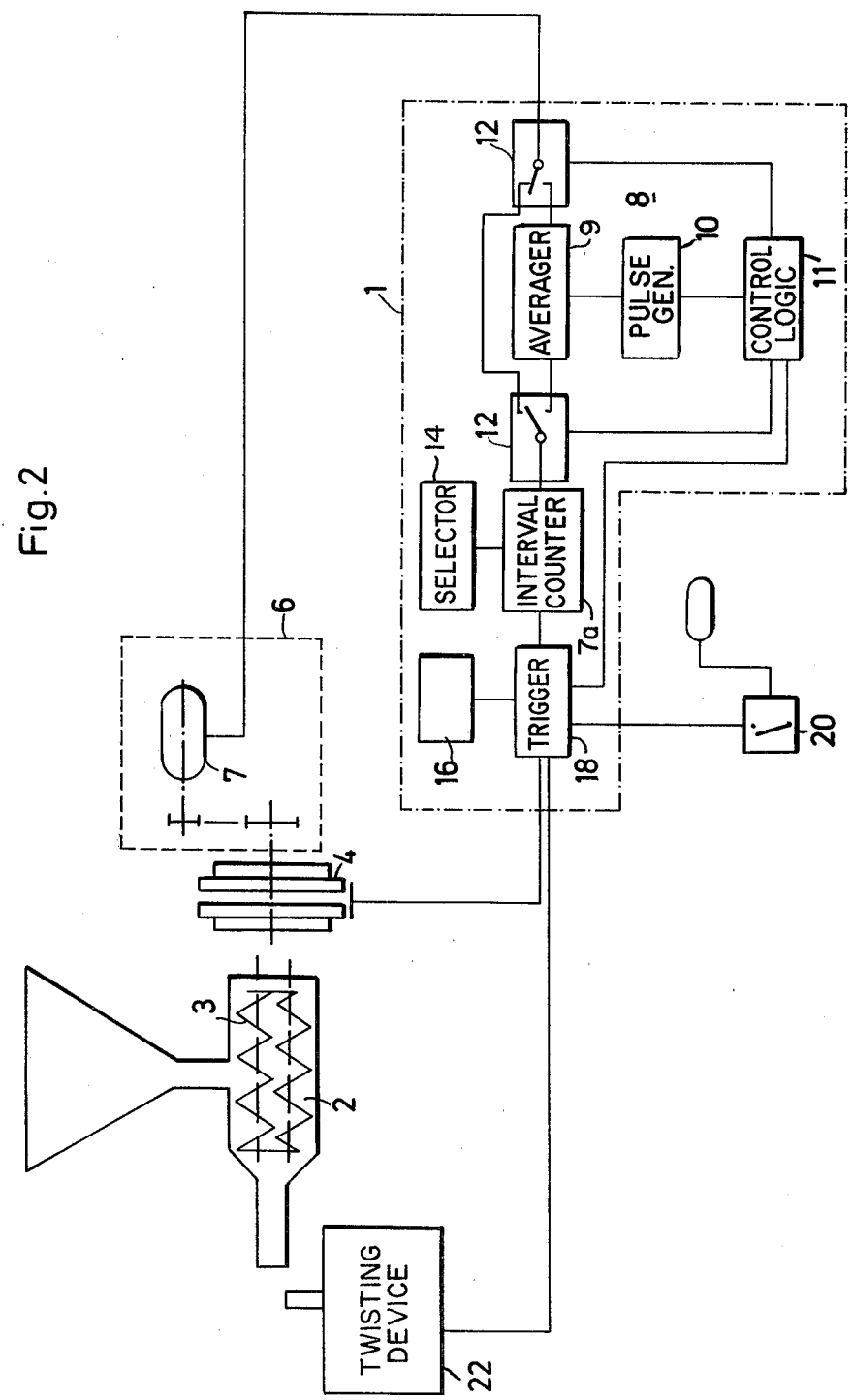
FIG. 2 illustrates a first embodiment of the apparatus of the present invention.

FIG. 2 shows a first embodiment of the apparatus constructed in accordance with the invention for dispensing a sausage material into a tubular casing. A conveyor pump 2 has two cooperating conveyor screws 3 and is intermittently coupled to a continuously operating drive via an electromagnetically actuated coupling 4. During the filling steps, the pump conveys a sausage material into a tubular casing which is mounted over an output spout of the pump. The sausage mass is dispensed into the tubular casing in portions of the desired volume.

A twisting device 22 twists off the empty casing section adjoining the last-filled section thereof as soon as a control device 1 terminates the filling cycle by deactivating the conveyor screws 3 and energizes the twisting device, in accordance with the sequencing illustrated in FIG. 1. A measuring device 6 includes a converter 7 operatively connected with the driven end of the coupling shaft which measures the angle of rotation of the conveying screws 3 and transforms it into a number of electric output signals proportional to the angle of rotation. The output signals emitted within any time interval are a measure of the volume which was conveyed by the pump and dispensed into the casing during such time interval.

An interval counter 7a is mounted in series with converter 7. Its counting interval is programmed by a selector 14 so that it corresponds to the desired volume of the portions to be dispensed by the conveyor pump 2. The selector device may, for example, comprise a decade switch or a keyed input which is followed by an interim memory. The trigger 18 has a first output connected with the electromagnetic control of coupling 4 and a second output connected with the twisting device 22. The entire control device 1 is activated or deactivated with a toggle switch 20 which is also connected to trigger 18.

A device 8 for determining the volume of the terminal mass precedes interval counter 7a and can be connected therewith by means of reversal switches 12. The device 8 comprises an averager 9, a pulse generator 10 and a control logic 11. The pulse generator is connected with the averager 9 and the control logic 11 and serves for adjusting the stored mean value in the interval counter 7a. At the correct point in time, the control logic 11 reverses switches 12 into their first position, in which the interval counter 7a is directly connected with converter 7. During each braking interval, the control logic 11 connects the device 8 to converter 7 for measuring the volume of terminal mass. An average of a predetermined, constant number of measured terminal volumes which immediately preceded the operating cycle in question, together with the last measured terminal volume is then formed into a new mean value in the averager 9 and kept available as the "measured volume of the terminal mass".

In operation, the counter 7a receives counting pulses and counts through the counting interval as set by the selector 14 and which corresponds to the desired volume of sausage material to be dispensed At the end of the counting interval, the interval counter 7a emits a trigger pulse to the trigger 18. Simultaneously, the trigger emits a braking signal to the control of the coupling 4 to terminate the filling step. At the same time the counter 7a resets itself to the beginning of the counting interval. During the braking interval, which is now in progress, the device 8 is connected to converter 7, counts the volume of the terminal mass and with it updates the mean value of the measured volume of the terminal mass. As soon as the updated mean value is available, which occurs in the pause following the last filling step, the control logic 11 connects the averager 9 with the interval counter 7a, and sends to the interval counter 7a a number of counting pulses corresponding to the mean value of the measured volume of the terminal mass. The counting interval for the next filling cycle is thereby shortened by the mean volume of terminal mass.

Prior to the start of a new filling step, the counter 7a is directly connected to converter 7. It then counts the output signals of the converter which correspond to the volume dispensed by the conveying pump from the beginning of the next filling step. At the end of the counting interval, a new trigger pulse is emitted to brake the conveyor screw 3, and the counter again resets itself. During the braking interval, the device 8 updates the mean value of the measured volume of the terminal mass.

In this new cycle, braking of the filling step at point C is triggered after the lapse of a counting or time interval which is shortened by the measured mean volume of the terminal mass. During the following braking interval, the trailing mass flows into the just dispensed portion of sausage material to thereby bring the whole portion of sausage material to the desired volume.

Figure 3:
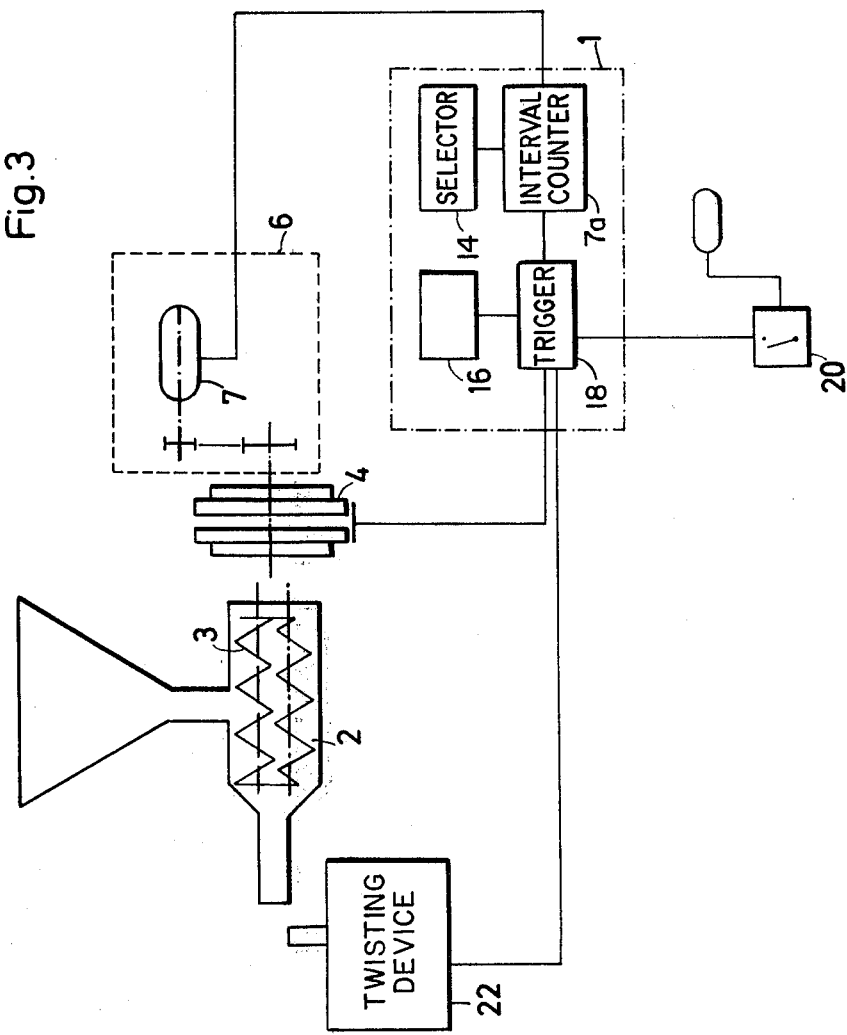
FIG. 3 illustrates a second embodiment of the apparatus of the present invention.

FIG. 3 illustrates another embodiment of the invention which substantially corresponds to the embodiment of FIG. 2, but which operates without averaging the volume of the terminal mass. Instead it keeps available, as the actual volume of the terminal mass, the volume measured during the braking step of the preceding operating cycle.

In the embodiment shown in FIG. 3, the counting interval which corresponds to the desired volume of the sausage material to be dispensed and which is set with selector 14 is programmed into the interval counter 7a. At the end of the counting interval, the counter triggers a pulse to brake the conveyor screws 3 and simultaneously resets itself to the start of the next counting interval. The interval counter 7a is continuously connected with the converter 7 of the measuring device 6. Immediately after resetting, that is, after the braking step has been triggered, the counter 7a receives from the conveyor 7 a number of pulses corresponding to the measured volume of the terminal mass. The predetermined counting interval is thereby shortened by the just measured terminal volume. When the next filling cycle begins, the interval counter 7 counts the shortened interval fully and then emits a trigger pulse for braking the screw 3 and again resets itself. Thus, up to the braking point, an amount is conveyed during the filling step which corresponds to the volume difference (shortened counting interval) between the desired volume of the portion to be dispensed (predetermined counting interval) and the volume of the terminal mass. The desired volume of the portion is attained during the braking step with the terminal volume.

In the embodiments of FIGS. 2 and 3, the interval counter 7a fulfills the function of a subtracting device which subtracts the terminal volume (number of counting pulses counted during the braking interval) from the desired volume of the portion (predetermined counting interval) and thus produces the shortened counting interval. In the embodiment of FIG. 3, the interval counter 7a also performs the function of the device 8 (shown in FIG. 2) for ascertaining the terminal volume; a separate device 8 is not required in this embodiment.

The conveyor pump 2 may also be a wing cell pump or an axial piston pump.

I claim:

1. In a method for intermittently dispensing a flowable foodstuff into containers in portions of a predetermined size including the steps of conveying the foodstuff with a conveyor into a container, braking the conveyor so as to deliver a portion of foodstuff into a container, replacing the container with a fresh container, and conveying another portion into the fresh container, the improvement comprising the steps of measuring a terminal mass of the foodstuff flowing into the container during the step of braking, forming a difference value between the portion of predetermined size and the measured terminal mass, and thereafter initiating the braking step after a quantity of the foodstuff has been conveyed into the fresh container which equals the difference value so that the terminal mass continuing to flow into the fresh container after the initiating step supplies sufficient additional foodstuff to bring the portion in the fresh container to the predetermined size.

2. A method according to claim 1 wherein the step of measuring is performed during the braking step of the immediately preceding conveying step.

3. A method according to claim 1 wherein the step of measuring comprises the steps of measuring the terminal mass as a mean terminal mass derived from a plurality of individual terminal masses measured during the braking steps following a predetermined number of preceding conveying steps.

4. A method according to claim 1 wherein the step of initiating chronologically overlaps the step of replacing.

5. A method according to claim 1 wherein the step of replacing chronologically overlaps the start of the next conveying step.

6. A method according to claim 1 wherein the predetermined size of the portion, the terminal mass, and the quantity of foodstuff are measured by volume.

7. In an apparatus for intermittently dispensing a flowable foodstuff into containers in portions of a predetermined size, the apparatus including an intermittently driven conveyor for dispensing the foodstuff into the containers a control device having means for selecting the desired portion size, means for measuring the foodstuff size dispensed by the conveyor, and means responsive to the quantity of foodstuff dispensed by the conveyor for initiating the braking of the conveyor, whereby a terminal mass of foodstuff flows into the last dispensed portion during braking of the conveyor, the improvement comprising means for measuring the terminal mass, means for forming a difference value between the predetermined portion size and the measured terminal mass and for storing the value, and means for triggering the initiating means for braking the conveyor when the quantity of foodstuff dispensed by the conveyor into the container and measured by the measuring means equals the stored difference value.

8. Apparatus according to claim 7 wherein the conveyor comprises a rotary pump and a coupling for intermittently driving the pump, wherein the measuring means includes a converter adapted to measure the angle of rotation of the pump and emitting a number of electric output signals proportional to the angle of rotation, and wherein the determining means is disposed in series with the converter and is adapted to determine the volume of the terminal mass from the number of output signals emitted by the converter.

9. Apparatus according to claim 8 wherein the determining means includes means for measuring the terminal mass during each braking of the pump.

10. Apparatus according to claim 9 wherein the determining means is adapted to determine the terminal mass dispensed by the pump during the immediately preceding braking of the pump.

11. Apparatus according to claim 10 wherein the means for forming a difference value includes means for storing a predetermined, constant number of terminal masses determined during a like number of immediately preceding brakings of the conveyor, and including means for averaging the stored terminal masses to thereby generate an average determined terminal mass for a corresponding number of immediately preceding determined terminal masses.

12. Apparatus according to claim 8 including an interval counter coupled to receive counting pulses from the converter and adapted to count through a counting interval set by the selecting means, wherein the counting interval corresponds to the required time period for the conveyor to dispense the predetermined portion volume, the interval counter emitting a trigger pulse at the end of the counting interval for actuating the initiating means to brake the pump, the interval counter further being adapted to simultaneously reset itself for starting another counting interval, means for applying to the interval counter, after resetting thereof, a number of pulses responsive to the determined terminal mass, the interval counter, as of the start of the next operating cycle of the pump, additionally counting the output signals of the converter until the end of the counting interval has been reached for generating a new trigger pulse to brake the pump and for resetting the interval counter thereafter.

13. Apparatus according to claim 12 wherein, immediately after resetting and triggering of the braking of the conveyor, the interval counter counts and stores the output signals of the converter until the conveyor pump comes to a standstill, so that the last mentioned count represents a measured value for the terminal mass dispensed during the first completed braking of the conveyor pump, and wherein during the start of the next dispensing step of the conveyor pump the interval counter counts the output signals of the converter until the end of the counting interval has been reached, whereupon a new trigger pulse for braking the conveyor pump is emitted and the counter resets itself.

14. Apparatus according to claim 8 wherein the conveyor pump comprises a rotary pump having first and second conveyor screws.

* * * * *